US010181239B2

(12) United States Patent
Oropeza

(10) Patent No.: US 10,181,239 B2
(45) Date of Patent: Jan. 15, 2019

(54) METHOD FOR ASSIGNING A WILD SYMBOL ON A GAMING DEVICE

(71) Applicant: IGT, Las Vegas, NV (US)

(72) Inventor: Freddy J. Oropeza, Reno, NV (US)

(73) Assignee: IGT, Las Vegas, NV (US)

( * ) Notice: Subject to any disclaimer, the term of this patent is extended or adjusted under 35 U.S.C. 154(b) by 1128 days.

(21) Appl. No.: 14/285,044

(22) Filed: May 22, 2014

(65) Prior Publication Data

US 2015/0339889 A1 Nov. 26, 2015

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2018.01) |
| ***G07F 17/34*** | (2006.01) |
| ***G07F 17/32*** | (2006.01) |

(52) U.S. Cl.

CPC .......... *G07F 17/34* (2013.01); *G07F 17/3244* (2013.01)

(58) Field of Classification Search

CPC .......................... G07F 17/3262; G07F 17/3286

See application file for complete search history.

(56) References Cited

U.S. PATENT DOCUMENTS 6,604,740 B1 8/2003 Singer et al.
6,692,354 B2 * 2/2004 Tracy ...................... G07F 17/32 463/16
7,048,275 B2 5/2006 Adams
7,980,946 B2 7/2011 Marks et al.
7,993,199 B2 8/2011 Iddings et al.
8,118,662 B2 2/2012 Caputo et al.
8,303,393 B2 11/2012 Jaffe et al.
8,444,467 B2 5/2013 Englman et al.
8,449,362 B2 5/2013 Jackson
8,500,551 B2 8/2013 Baerlocher et al.
8,556,708 B2 10/2013 Hornik et al.
8,784,176 B2 7/2014 Ryan
2004/0053673 A1 * 3/2004 Mishra ................ G07F 17/3244 463/20
2005/0148384 A1 7/2005 Marks et al.
2010/0081494 A1 4/2010 Tessmer

* cited by examiner

*Primary Examiner* — Kang Hu
*Assistant Examiner* — Jason Pinheiro
(74) *Attorney, Agent, or Firm* — Neal, Gerber & Eisenberg LLP

(57) ABSTRACT

A method of operating a gaming machine having a game controller includes receiving, via an input device of the gaming machine, a request from a player to play a game, generating, via a game controller and based on the request to play the game, a symbol combination comprising one or more symbols, wherein the symbol combination is associated with a first payout amount, displaying the symbol combination to the player via a display device, receiving, via the input device, a request from the player to assign a wild symbol, generating the wild symbol based on the request from the player and displaying the wild symbol to the player via the display device, determining whether any of the one or more symbols in the symbol combination matches the wild symbol and providing an indication to the player of any matching symbols via the display device, calculating a second payout amount for the symbol combination based on the matching symbols, wherein the second payout amount is at least equal to the first payout amount, and providing an indication of the second payout amount to the player.

23 Claims, 6 Drawing Sheets

METHOD FOR ASSIGNING A WILD SYMBOL ON A GAMING DEVICE

BACKGROUND

Electronic gaming machines, such as those found in a casino environment, often provide games (e.g., slot games, video poker games, etc.) that generate combinations of symbols to produce game outcomes. The symbols may be selected at random from a predetermined set of symbols for each round of the game. During the gaming round, one or more of the predetermined set of symbols may be assigned as a "wild symbol," such that any matching symbols within the combination of symbols are given an enhanced role in game play, such as a greater value (e.g., to increase the payout associated with a particular game outcome), a greater ability to make combinations with other symbols (e.g., such as when the wild symbol is used as a "match" with one or more other symbols of a symbol combination), and so on.

SUMMARY

An exemplary embodiment relates to a method of operating a gaming machine having a game controller. The method includes receiving, via an input device of the gaming machine, a request from a player to play a game, generating, via a game controller and based on the request to play the game, a symbol combination comprising one or more symbols, wherein the symbol combination is associated with a first payout amount, displaying the symbol combination to the player via a display device, receiving, via the input device, a request from the player to assign a wild symbol, generating the wild symbol based on the request from the player and displaying the wild symbol to the player via the display device, determining whether any of the one or more symbols in the symbol combination matches the wild symbol and providing an indication to the player of any matching symbols via the display device, calculating a second payout amount for the symbol combination based on the matching symbols, wherein the second payout amount is at least equal to the first payout amount, and providing an indication of the second payout amount to the player.

Another exemplary embodiment relates to a gaming device for providing a game. The device includes a display configured to display the game to a player, a user input device, and a game controller having a processor and a storage device storing instructions that, when executed by the processor, cause the processor to perform operations. The operations include receiving, via the user input device, a request from the player to play a game, generating, via the game controller and based on the request to play the game, a symbol combination comprising one or more symbols, wherein the symbol combination is associated with a first payout amount, displaying the symbol combination to the player via the display, receiving, via the user input device, a request from the player to assign a wild symbol, generating the wild symbol based on the request from the player and displaying the wild symbol to the player via the display, determining whether any of the one or more symbols in the symbol combination matches the wild symbol and providing an indication to the player of any matching symbols via the display, calculating a second payout amount for the symbol combination based on the matching symbols, wherein the second payout amount is at least equal to the first payout amount, and providing an indication of the second payout amount to the player.

Another exemplary embodiment relates to a computer-readable storage medium having machine instructions stored therein, the instructions being executable by a processor to cause the processor to perform operations. The operations include receiving, via an input device of a gaming machine, a request from a player to play a game, generating, based on the request to play the game, a symbol combination comprising one or more symbols, wherein the symbol combination is associated with a first payout amount, causing a display of the gaming machine to display the symbol combination to the player, receiving, via the input device, a request from the player to assign a wild symbol, generating the wild symbol based on the request from the player and causing the display to display the wild symbol to the player, determining whether any of the one or more symbols in the symbol combination matches the wild symbol and providing an indication to the player of any matching symbols via the display, calculating a second payout amount for the game outcome based on the matching symbols, wherein the second payout amount is at least equal to the first payout amount, and providing an indication of the second payout amount to the player.

BRIEF DESCRIPTION OF THE FIGURES

The details of one or more implementations are set forth in the accompanying drawings and the description below. Other features, aspects, and advantages of the disclosure will become apparent from the descriptions, the drawings, and the claims, in which:

DETAILED DESCRIPTION

Numerous specific details may be set forth below to provide a thorough understanding of concepts underlying the described implementations. It may be apparent, however, to one skilled in the art that the described implementations may be practiced without some or all of these specific details. In other instances, some process steps have not been described in detail in order to avoid unnecessarily obscuring the underlying concept.

A method for providing a game at a gaming machine is described. The game includes one or more symbol combinations that are used to determine a game outcome and/or a payout amount for a gaming round or session. The game allows a player of the game to initiate the assignment of a wild symbol for use within the game. The wild symbol is used to modify a payout associated with a particular symbol combination (e.g., when the wild symbol matches one or more symbols of the symbol combination, when the wild symbol provides the player with more winning paylines, when the wild symbol is used as a multiplier, etc.), or to provide additional winning symbol combinations. In various embodiments, the wild symbol is randomly assigned upon receiving a request from the player. In certain embodiments, the player is provided with the option to request or initiate selection of the wild symbol to increase excitement for the player. In one embodiment, the action of the player is given the appearance of impacting the symbol that is assigned as the wild symbol, however, the assignment of the wild symbol remains random. In other embodiments, the action of the player actually impacts the selection of the wild symbol (i.e., the player is given an amount of control over the selection of the wild symbol).

Figure 1:
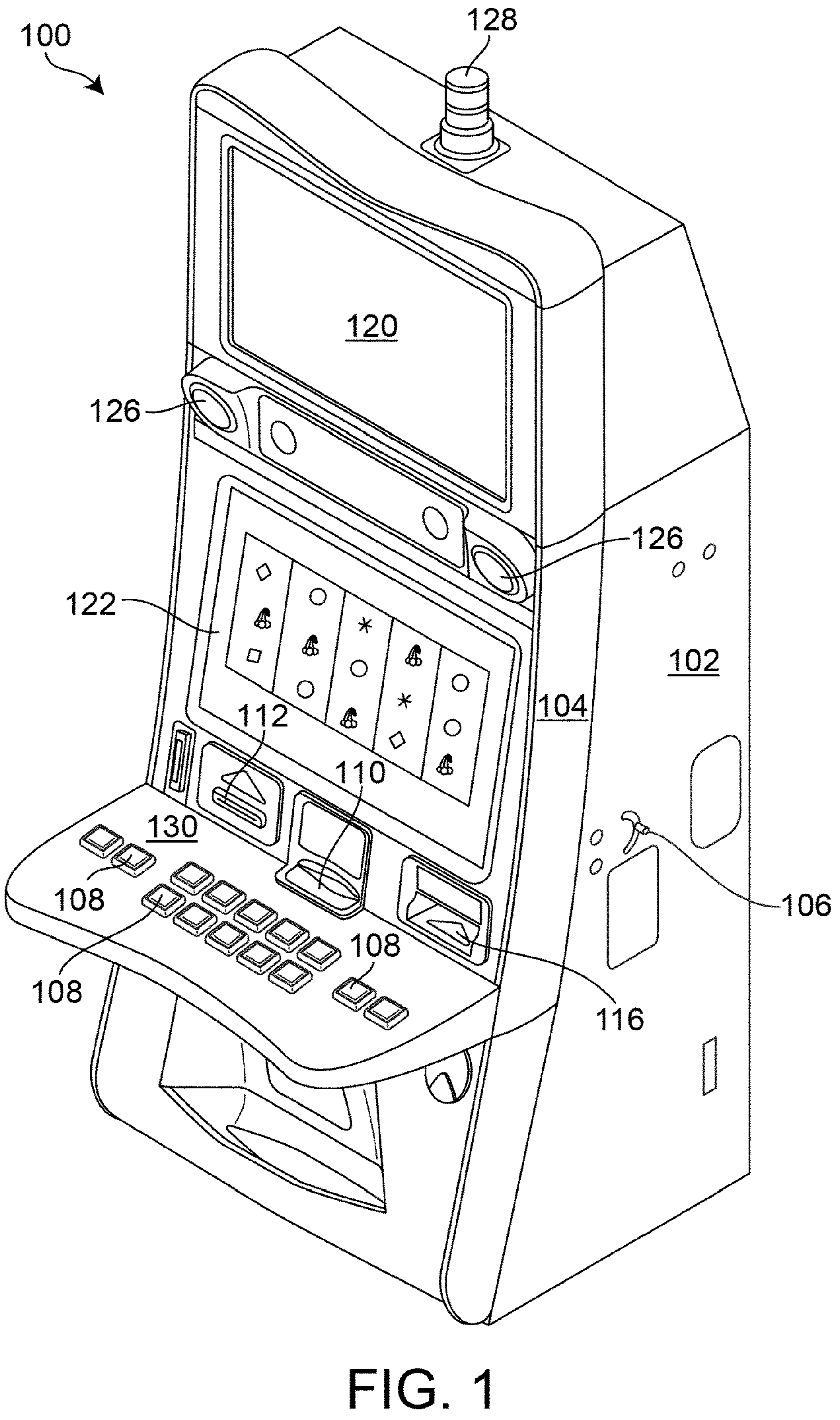
FIG. 1 is a perspective view of a gaming machine for use within a gaming environment, according to an exemplary embodiment.

Referring to FIG. 1, a gaming machine 100 (i.e., gaming device) is shown according to an exemplary embodiment. In this embodiment, the gaming machine 100 includes a main cabinet 102. The main cabinet 102 provides a secure enclosure that prevents tampering with device components, such as a game controller (not shown) located within the interior of the main cabinet 102. The main cabinet 102 includes an access mechanism, such as door 104, which allows the interior of the gaming machine 100 to be accessed. Actuation of the door 104 may be controlled by a locking mechanism 106 intended to limit access to the interior of the gaming machine 100. In some embodiments, the locking mechanism, the door 104, and the interior of the main cabinet 102 may be monitored with security sensors of various types to detect whether the interior has been accessed. For instance, a light sensor may be provided within the main cabinet 102 to detect a change in light-levels when the door 104 is opened and/or an accelerometer may be attached to the door 104 to detect when the door 104 is opened.

The gaming machine 100 includes any number of user interface devices that convey sensory information to a user and/or receive input from the user. For example, the gaming machine 100 may include electronic displays 120, 122, speakers 126, and/or a candle device 128 to convey information to the user of the gaming machine 100. The electronic displays 120 and 122 may be a cathode ray tube (CRT) monitor, a liquid crystal display (LCD) monitor, or another type of electronic display suitable for a particular application of the gaming machine 100. In one embodiment, display 120 and/or display 122 may also be a touch screen display configured to receive input from a user. Various embodiments of the gaming machine 100 may also utilize the electronic displays 120 and 122 to provide additional features to a base game being played on gaming machine 100.

The gaming machine 100 includes a console 130 coupled to the door 104 and having one or more inputs 108 (e.g., buttons, track pads, etc.) configured to receive input from a user. A controller (e.g., game controller) within the gaming machine 100 may run a game, such as a wager-based game, in response to receiving input from a user via the inputs 108 or the display 122. For example, the inputs 108 may be operated to place a wager in the game and to run the game. In response, the controller may execute and display results of the game on displays 120 and 122, such as by causing the reels shown on display 122 to spin (e.g., with a software-based slot game). The controller may also display information related to the game play to the user of the gaming machine 100 via the displays 120 and 122. During the game, the user may view additional game information and/or be presented with additional game options using the electronic display 122. During certain game events, the gaming machine 100 may display visual effects and/or emit audible effects that are perceived by the player in order to add excitement to the game or attract players to the gaming machine 100. Visual effects may include flashing lights, strobe lights, and/or other visual effects produced or otherwise displayed by lights (not shown) on the gaming machine 100. Moreover, visual effects may be displayed via patterns on the electronic displays 120 and/or 122. Auditory effects may include various sounds that are projected by the speakers 126.

The gaming machine 100 may also include devices for conducting a wager-based game. For example, the gaming machine 100 may include a ticket acceptor 116 and a printer 110. In various embodiments, the gaming machine 100 may be configured to run on credits that may be redeemed for money and/or other forms of prizes. The ticket acceptor 116 may read an inserted ticket having one or more credits usable to play a game on the gaming machine 100. For example, a player of the gaming machine 100 may wager one or more credits within a slot game. If the player loses, the wagered amount may be deducted from the player's remaining balance on the gaming machine 100. However, if the player wins, the player's balance may be increased by the amount won. Any remaining credit balance on the gaming machine 100 may be converted into a ticket via the printer 110. For example, a player of the gaming machine 100 may cash out of the machine 100 by selecting to print a ticket via the printer 110. The ticket may then be used to play other gaming devices or redeemed for cash and/or prizes. According to various embodiments, the gaming machine 100 may record data regarding its receipt and/or disbursement of credits. For example, the gaming machine 100 may generate accounting data whenever a result of a wager-based game is determined. In some embodiments, the gaming machine 100 may provide accounting data to a remote data collection device, allowing remote monitoring of the gaming machine 100.

In one embodiment, the gaming machine 100 includes a loyalty card acceptor 112. In general, a loyalty card may be tied to a user's loyalty account. A loyalty account may store various information about the user, such as the user's identity, the user's gaming preferences, the user's gaming habits (e.g., which games the user plays, how long the user plays, etc.), or similar information about the user. A loyalty account may also be used to reward a user for playing the gaming machine 100. For example, a user having a loyalty account may be given a bonus turn on the gaming machine 100 or credited loyalty points for playing the gaming machine 100. Such loyalty points may be exchanged for loyalty rewards (e.g., a free meal, a free hotel stay, a free room upgrade, discounts, etc.).

Figure 2:
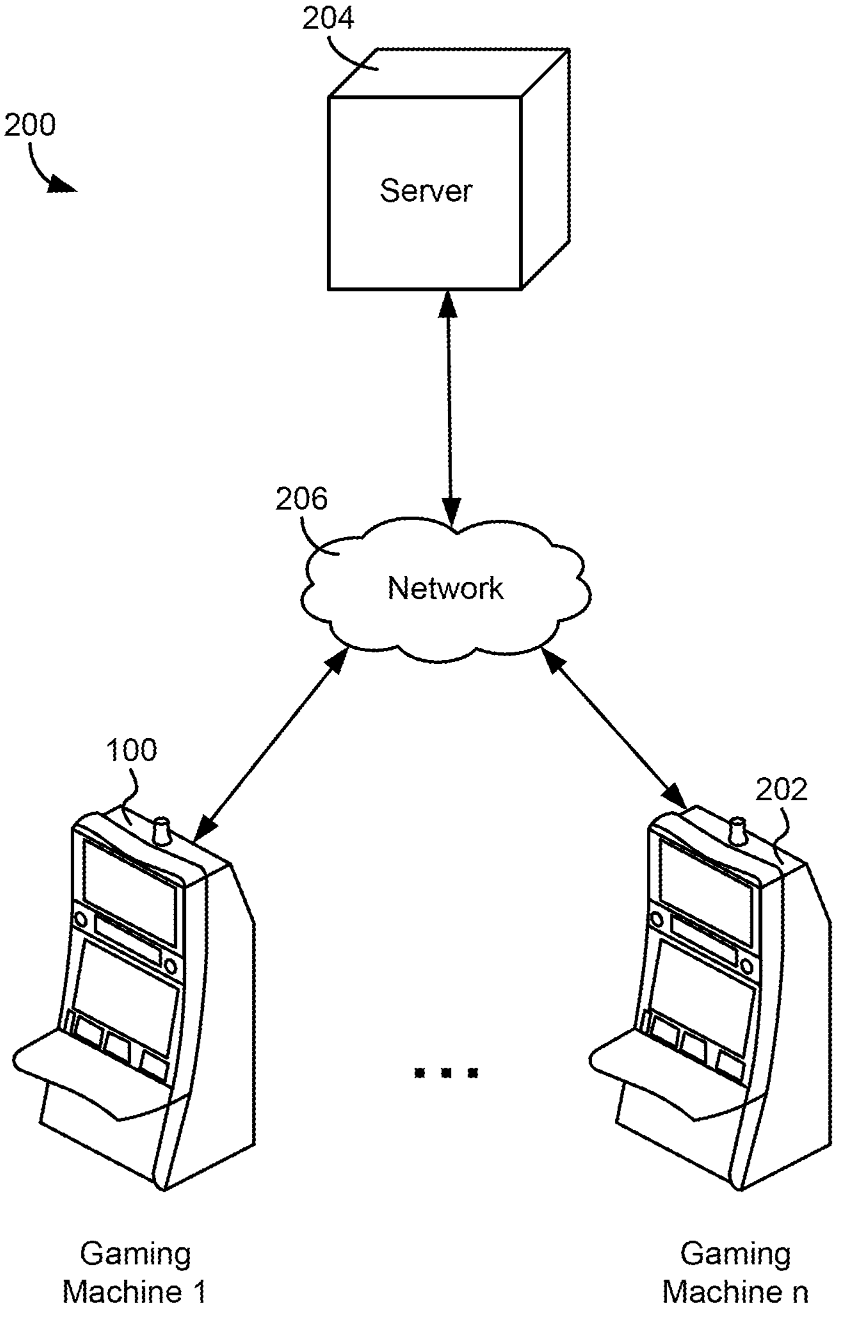
FIG. 2 is a block diagram of a gaming system, according to an exemplary embodiment.

Referring now to FIG. 2, an illustration of a gaming system 200 is shown, according to an exemplary embodiment. In general, gaming system 200 is configured to allow a player to play instances of one or more wager-based games by providing the wager-based games at a gaming machine (e.g., machine 100). The gaming system 200 may include one or more gaming machines 100, which may be located physically within one or more entertainment locations, such as casinos, racetracks, bars, etc. Gaming system 200 may also include any number of servers and other devices, such as server 204, which support the various functions described herein. The servers and gaming machines may be located at more than one physical location (e.g., entertainment locations) and configured to communicate remotely as part of the gaming system 200. The gaming system 200 may further include a network 206 through which the gaming machines 100 and/or server 204 communicate.

Network 206 may be any form of communications network that conveys data between the gaming machines 100 and server 204. The network 206 may include any number of wired or wireless connections, in various embodiments. For example, the server 204 may communicate with gaming machines 100 over a wired connection that includes a serial cable, a fiber optic cable, a CATS cable, or any other form of wired connection. In another example, the server 204 may communicate with the gaming machines 100 via a wireless connection (e.g., via WiFi, cellular, radio, etc.). The network 206 may also include any number of local area networks (LANs), wide area networks (WANs), or the Internet. For example, the server 204 may communicate with the gaming machines 100 via a casino's LAN. Accordingly, the network 206 may include any number of intermediary networking devices, such as routers, switches, servers, etc.

In various embodiments, the server 204 and the gaming machines 100 may utilize a gaming protocol, such as G2S or SAS, to communicate via the network 206. Such a gaming protocol may include security features to ensure the integrity of communications between the devices in the gaming system 200. For example, a communication between the gaming machine 100 and the server 204 using G2S may be encrypted using a secure socket layer (SSL) encryption technique. The communication may then be decrypted by the receiving device, thereby ensuring the integrity of the communicated data.

The server 204 may be configured to maintain player loyalty accounts. In general, a loyalty account may include information about the player's identity, rewards or loyalty points earned by the player (e.g., for playing wager-based games, on the player's birthday, etc.), game play data for the player (e.g., games played, amount wagered, types of machines used, etc.), or other such information. For example, a user of gaming machine 100 may link his or her loyalty account to the gaming machine 100, so that he or she can gain loyalty points, free turns, etc., while playing the gaming machine 100.

The server 204 may include a single computing device or a collection of computing devices (e.g., a data center, cloud computing devices, etc.) that communicate via network 206. The server 204 may include one or more processors that execute machine instructions stored in electronic memories. In one embodiment, the server 204 is configured to execute game logic and/or perform other tasks on behalf of the gaming machines 100. For instance, the server 204 may be configured to provide (e.g., load) game content to the gaming machines 100 as part of an interactive game that is playable at the gaming machines 100. The game content may be provided in response to data received from the gaming machines 100, such as in response to input received from a user (e.g., player) of the gaming machines 100. The game content may also be provided in response to data otherwise received at the server 204 as part of the gaming system 200.

In one embodiment, the server 204 is configured to provide a particular game on the gaming machines 100 by executing game logic locally and communicating resulting game content to the gaming machines 100 via the network 206. In this embodiment, a portion or all of the game data required for executing the game may be stored at the server 204 or in another storage location outside of the gaming machines 100. The gaming machines 100 may be configured to run a thin client (e.g., Adobe Flash or another such application) for communicating (e.g., displaying) game content provided by the server 204 to the player. In another embodiment, the server 204 is configured to provide a game at one of the gaming machines 100 as downloadable game software. For instance, the server 204 may be configured to provide downloadable software in response to a request received from the player. In this embodiment, the gaming machines 100 may be configured to download and run the software locally.

Figure 3:
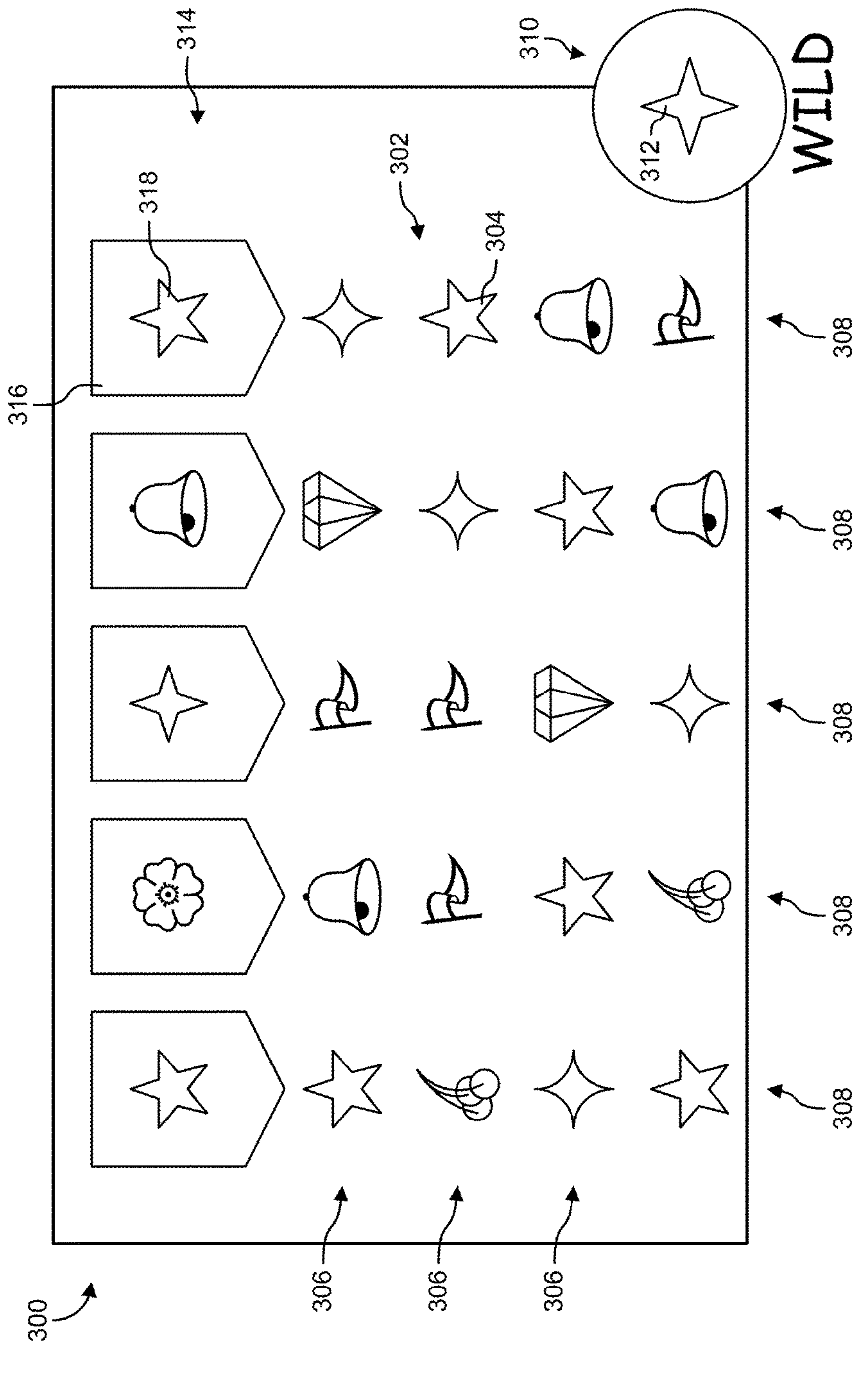
FIG. 3 is an illustration of a game of the present disclosure prior to assigning a wild symbol, according to one embodiment.
Figure 4:
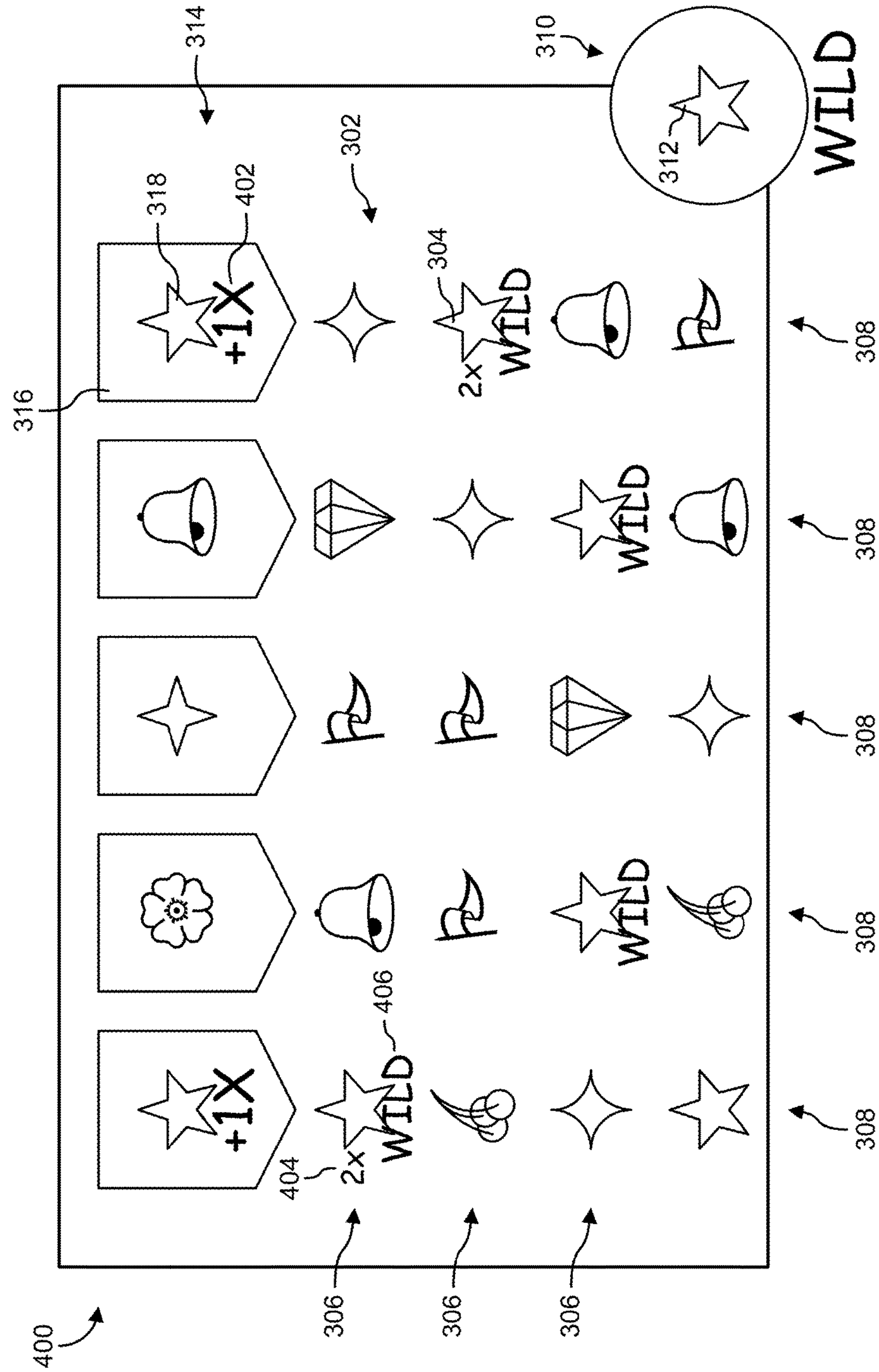
FIG. 4 is an illustration of the game of FIG. 3 after the wild symbol has been assigned, according to one embodiment.

Referring now to FIGS. 3 and 4, a game is shown that may be provided via the gaming machine 100 and/or the gaming system 200, according to an exemplary embodiment. The game is shown by way of example in order to illustrate the systems and methods of the present disclosure. In particular, the game allows a player of the gaming machine 100 to cause a wild symbol to be assigned for a particular gaming round at the gaming machine 100. In the illustrated embodiment, the game includes a grid section 302 comprising a number of spaces for displaying a plurality of symbols 304 (e.g., a combination of symbols). The symbols 304 may be generated or selected (e.g., at random) from a predetermined set of game symbols (e.g., a symbol set). In the illustrated embodiment, the grid section 302 includes five (5) columns 308 and four (4) rows 306, for a total of twenty (20) spaces. As shown, the displayed symbols 304 may include various images. Although the symbols 304 are shown as illustrated, in other embodiments the symbols 304 may be generated or selected based on any other set of symbols appropriate or suitable for the particular game. For example, the predetermined set of symbols may include various fruits (e.g., watermelon, apples, etc.), cartoon characters, movie characters, letters, theme characters, playing cards, and the like.

In one embodiment, in addition to the grid section 302, an additional strip of symbols 314 extends across the top of the grid section 302. In one embodiment, the grid section 302 is initially shown as blank and the symbols appear to "drop" from the strip of symbols 314. In another embodiment, the grid section 302 is initially populated and the symbols are shown as part of a virtual reel, e.g., as in the reels of a slot machine. Although the game is shown as a computerized or electronic game comprised of symbols that are displayed via an electronic display (e.g., displays 120, 122), in other embodiments the grid section 302 and strip 314 may be provided using mechanical reels that rotate to display a plurality of game symbols. The gaming machine on which the game is played (e.g., machine 100) provides various controls for use by the player to control the game. For example, the player may operate the controls of the machine 100 (e.g., press one or more of the buttons 108, manipulate the touchscreens of displays 120, 122, etc.) to cause the reels in the grid section 302 to cycle or spin, causing a random combination of the predetermined set of symbols (e.g., a game outcome illustrated as symbols 304) to be displayed within the grid section 302. In some embodiments, the gaming machine may require that a wager be placed in order to cycle or spin the reels.

The strip 314 is configured to cycle or rotate through the predetermined set of symbols, assigning a symbol 318 to each of sections 316. In an exemplary embodiment, the symbol 318 for each section 316 is assigned randomly from the predetermined set of symbols when the strip 314 is cycled. The player of the gaming machine 100 may cause the symbols in strip 314 to cycle, such as by sending a request via the controls (e.g., buttons 108) of the machine 100. The symbols in the strip 314 may be cycled when the symbols in grid section 302 are cycled, or the strip 314 may be cycled separately from other actions of the game (e.g., in response to an additional request from the player).

Each section 316 of the strip 314 is configured to interact with the column 308 directly below it. For instance, a winning outcome may occur in each instance where the symbol 318 matches one or more of the plurality of symbols 304 within the corresponding column 308. The effect of the strip 314 (e.g., the symbols 318) and its relation to the grid section 302 (e.g., the symbols 304) will be described in further detail below. Although the strip 314 is positioned above the grid section 302 in the illustrated embodiment of FIGS. 3 and 4 and configured to interact with the column 308 of symbols 304 below it, the strip 314 may be otherwise positioned in other embodiments of the game and configured to otherwise interact with the grid section 302 according to its relative position.

The game also includes a wild section 310, wherein a wild symbol 312 is displayed. The wild section 310 may cycle through the predetermined set of symbols (e.g., the illustrated symbols 304) that are available as part of the game in order to assign the wild symbol 312. The wild symbol 312 may be randomly assigned. The wild section 310 may be configured to interact with the grid section 302 and/or the secondary reel strip 314 as part of the game. For instance, the wild section 310 may interact with the grid section 302 and reel strip 314 in order to modify a game outcome or payout of the game. In an exemplary embodiment, the assigned wild symbol 312 determines which of the set of symbols will be "wild" (e.g., substitute for any other symbol in determination of payouts, worth more points, worth more money as a payout, etc.) during a particular gaming round of the game (e.g., during a particular round of betting, until a final payout is calculated or paid, etc.). The gaming round may include cycling the symbols of the grid section 302 to produce a game outcome, cycling the symbols of the secondary strip 314 to assign the symbols 318, and cycling the symbol in the wild section 310 to assign the wild symbol 312. The gaming round may begin with a wager by the player and may be considered complete when the payout is calculated and/or paid out to the player. During a gaming round, all of the symbols 304 within the grid section 302 that match the wild symbol 312 may be considered "wild," which may improve an outcome (e.g., payout) of the game for the player.

The player may use one or more controls of the gaming machine 100 (e.g., buttons 108) to cause the wild section 310 to cycle (e.g., spin, rotate) through the symbol set in order to assign the wild symbol 312. The wild section 310 may also include a space on a display of the gaming machine 100 which is configured to depict assigning the wild symbol 312 from one of the predetermined set of symbols. In one embodiment, screens 300 and 400 are displayed on a touchscreen display (e.g., displays 120, 122) and the player may cause the wild section 310 to cycle (e.g., randomly assign the wild symbol 312) by pressing the area of the wild section 310 on the touchscreen display. In another embodiment, the wild section 310 may be implemented using a mechanical reel having at least one of each symbol of the symbol set on the reel and configured to spin in order to cycle through the symbol set.

In one embodiment, the action of the player is given the appearance of impacting the symbol that is assigned, however, the assignment of the symbol remains random. For example, the player may initiate selection of the wild symbol, however, once the selection is initiated, the symbols shown in the wild section 310 may continue to randomly cycle for a limited period of time and ultimately stop at a symbol that is randomly determined or predetermined by a processor of the gaming machine (e.g., gaming machine 100). As another example, the player may initiate selection of the wild symbol, however, once the selection is initiated, the symbols shown in the wild section 310 may continue to cycle according to a predetermined sequence for a random amount of time. In other embodiments, the action of the player actually impacts the selection of the wild symbol, i.e., the player is given an amount of control over the selection of the wild symbol whereby the time of the actuation of the wild symbol selection determines the wild symbol that will be selected by a processor of the gaming machine.

In an exemplary embodiment, the player may cycle the wild section 310 separately from the reels of the grid section 302 and/or the strip 314. For instance, the game may allow the player to cycle the wild section 310 (i.e., assign the wild symbol 312) at the start of a gaming round (e.g., after placing a wager). The symbols of grid section 302 and the strip 314 may then be cycled to determine a payout for the gaming round based on whether there are any matches between the symbols in the strip 314 and the symbols in the corresponding column of grid section 302. Such winning outcomes may be further enhanced to the extent the matches involve symbols designated as wild by the wild symbol 312. In another embodiment, the game may allow the player to cycle the wild section 310 after the grid section 302 and the strip 314 have been cycled. In other embodiments, the player may have the option to assign the wild symbol 312 by cycling the wild section 310 at any one point during a gaming round.

Although in the described embodiment the player is only allowed to randomly assign the wild symbol 312 once during a gaming round, in other embodiments the player may be allowed to randomly assign the wild symbol 312 more than once. For instance, the player may be allowed to place an additional wager in order to cycle the wild section 310 a second time, such as to achieve a better (e.g., higher) payout for the gaming round.

Referring specifically to FIG. 3, screen shot 300 is representative of the game during a gaming round, according to one embodiment. In this embodiment of the game, the wild symbol 312 is assigned after the grid section 302 and the secondary strip 314 have been cycled (i.e., after the symbols in grid section 302 and the symbols in strip 314 have been assigned). However, as described above these steps may be otherwise ordered or performed simultaneously in other embodiments of the game. Screen 300 shows a view of the game after the grid section 302 and the strip 314 have been cycled, but prior to assigning the wild symbol 312. At this point in the gaming round, the player may be prompted to "select," or assign, the wild symbol 312 by causing the wild section 310 to cycle randomly through the symbol set. For instance, in one embodiment the screen 300 may be displayed on a touchscreen and the player may be prompted to assign the wild symbol 312 by pressing a portion of the wild section 310 on one of the displays 120, 122. In another embodiment, the player may be able to assign the wild symbol 312 by manipulating one or more of the controls on the gaming machine 100.

Referring specifically to FIG. 4, screen shot 400 is representative of the game at or near the completion of the gaming round, according to one embodiment. Screen shot 400 is intended to be a continuation of the gaming round shown in screen shot 300, but after the wild symbol 312 has been assigned. The wild symbol 312 determines which of the symbols 304 within the grid section 302 will be modified or interpreted differently (i.e., designated as "wild") in order to calculate the payout for the gaming round. In an exemplary embodiment, a first payout amount may be calculated for a particular gaming round based on the game outcome (i.e., the combination of symbols 304 within the grid section 302). The payout may then be modified (e.g., multiplied) based on the wild symbol 312 and the strip 314 to produce a second payout amount. In an exemplary embodiment, the second payout amount is greater than or equal to the first payout amount. In another embodiment, only one payout is calculated and provided to the player. This is based on the payout calculated for the combination of symbol 304 and modified based on the wild symbol 312 and the strip 314.

As noted, the symbols 318 may be configured to add value to certain columns 308, symbols 304, or rows 306, depending on the configuration of the game. For instance, the symbols 318 may be configured to interact with the grid section 302 (e.g., based on matches between the symbols 318 and the symbols in the grid section 302). In the illustrated embodiment, the symbols 318 are configured to provide matches to the symbols 304 that are in the same column 308 (i.e., directly below the symbols 318), but in other embodiments the symbols 318 may be configured to otherwise interact with the grid section 302.

In the illustrated embodiment, the symbols 304 that match the wild symbol 312 (i.e., the matching symbols) are designated as wild. As shown in screen 400, these symbols may be designated with a wild marker 406. Symbols having the wild marker 406 may be modified or altered to produce a different (e.g., higher) payout for a gaming round. For instance, symbols having the wild marker 406 may be interpreted as creating a multiplier when calculating the payout (e.g., the second payout amount) in order to provide a higher payout for the player. In another embodiment, the symbols having the wild marker 406 may be given a higher dollar or point value (regardless whether there is a matching symbol). In another embodiment, the symbols having the wild marker 406 may be given a greater ability to make combinations with other symbols (i.e., such as when the wild symbol is used as a "match" with one or more other symbols of a symbol combination, e.g., along a payline extending between the columns). In another embodiment, the payout amount may be multiplied or otherwise modified according to the number of symbols within the grid section 302 having the wild marker 406 (i.e., matching the wild symbol 312, but without any matches with symbols in a corresponding column).

In the illustrated embodiment, the symbols 304 having the wild marker 406 (i.e., matching the wild symbol 312) receive an additional bonus multiplier 404 if the corresponding symbol 318 for that column also matches the wild symbol 312. The value of the bonus multiplier is indicated by bonus indicator 402 within the sections 316. For instance, in the illustrated embodiment the bonus indicators 402 indicate that the bonus multiplier is "+1×," so that each matching symbol 304 receives an additional "+1" bonus multiplier. Thus, the matching symbols 304 within the grid section 302 each have a bonus multiplier 404 of "2×." This may mean that the value of that particular symbol 304 within the game outcome is doubled, that the total payout (e.g., the second payout amount) is doubled, or that the multiplier is otherwise applied to produce a better payout for the gaming round. However, in other embodiments the wild symbol 312 may otherwise affect the game outcome and/or the payout within a particular gaming round. For instance, in other embodiments the game may be a variation of poker and the wild symbol 312 may be matched with one or more of the cards within the poker hand to produce various poker hands having various payout amounts. In another embodiment, each symbol 304 within the game may have a particular cash or point value and the wild symbol 312 may be used to determine a multiplier that will increase the cash or point value of any of the matching symbols 304. In certain embodiments, the multiplier value is predetermined, randomly determined, or fixed.

The secondary strip 314 may also be used as a way to trigger bonuses within a gaming round or otherwise as part of the game. For instance, if a certain amount or pattern of similar symbols land within the sections 316 after the secondary strip 314 is cycled, a bonus may be applied to the gaming round as part of, or in addition to, the payout. In an exemplary embodiment, if three of the symbols 318 are substantially the same, then a bonus (e.g., an extra spin, an extra cycle of the wild section 310, etc.) is applied to the gaming round. In other embodiments, the secondary strip 314 may include other types of symbols that indicate a multiplier or bonus, rather than including symbols 318 from the symbol set of the game. For instance, the secondary strip 314 may only include symbols which indicate a bonus amount or multiplier amount.

In various embodiments, the wild symbol 312 may be assigned (e.g., the wild section 310 may be cycled) by the player at any point within the gaming round. In one embodiment, the wild symbol 312 may be assigned more than once during a gaming round. For instance, the player may be able to place an additional wager in order to re-assign the wild symbol 312, such as to attempt to achieve a higher payout. The player may also be allowed to re-assign the wild symbol 312 as part of a bonus received according to the symbols 318, or as a result of matching one or more of the symbols 304, the wild symbol 312, and/or the symbols 318 to each other.

The wild section 310 may be cycled in a number of ways by the player. In some embodiments, the wild section 310 may be configured to cycle through the symbol set (e.g., randomly) during the gaming round and the player may be allowed to stop or slow the cycling of the wild section 310 to assign the wild symbol 312. In an exemplary embodiment, the player is allowed to select when the wild section 310 is slowed, but the player does not have any control over the assignment of the wild symbol 312 (e.g., the wild symbol 312 is assigned randomly). The player may be allowed to assign the wild symbol 312 at any point during the gaming round, or the player may be prompted during the game to assign the wild symbol 312 (e.g., after or before one or more game actions are performed). In some other embodiments, the wild section 310 is at rest and the player is allowed to manipulate the controls of the gaming machine 100 to start the wild section 310 cycling through the symbol set to randomly assign the wild symbol 312. Similarly, the player may have the option to assign the wild symbol 312 at any time or the player may be prompted to assign the wild symbol 312 at a certain point in the game.

In some embodiments, the grid section 302 may also include paylines for calculating a payout (e.g., points reward, cash payout, etc.) related to the combination of symbols 304 (e.g., game outcome) as part of the game. The paylines may include any combination of symbols within the grid section 302, and may also include symbols found in other sections of the game. The payout may be determined based on a relation of the symbols 304 to the one or more paylines (e.g., which of the symbols 304 are at or near the paylines). The payout may also be based on the wager placed by the player (e.g., point wager, cash wager, etc.) prior to the start of the game or an individual round of the game. For instance, the number of paylines and their placement within the game for a particular gaming round may be based on wager(s) or other decisions of the player, which may be entered using controls of the gaming machine 100.

Figure 5:
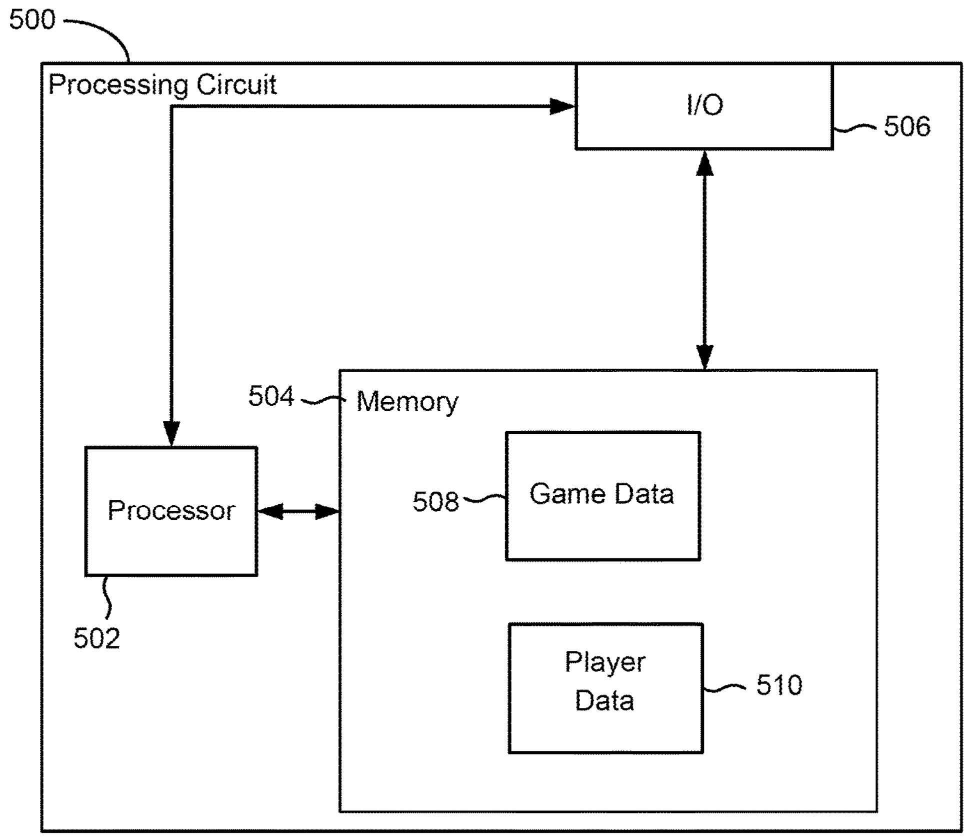
FIG. 5 is a block diagram of a processing circuit, according to an exemplary embodiment.

Referring now to FIG. 5, a block diagram of a processing circuit 500 is shown, according to an exemplary embodiment. Processing circuit 500 may be a processing component of any electronic device used as part of a gaming environment. For example, any of the server 204 and the gaming machine 100 may include the processing circuit 500. In another embodiment, the processing circuit 500 may be part of a computing system that includes multiple devices. In such a case, the processing circuit 500 may represent the collective components of the system (e.g., processors, memories, etc.). For example, the server 204 in communication with gaming machine 100 may form a processing circuit configured to perform the operations described herein.

The processing circuit 500 may include a processor 502 and a memory 504. Memory 504 stores machine instructions that, when executed by processor 502, cause processor 502 to perform one or more operations described herein. Processor 502 may include a microprocessor, FPGA, ASIC, any other form of processing electronics, or combinations thereof. Memory 504 may be any electronic storage medium such as, but not limited to, a floppy disk, a hard drive, a CD-ROM, a DVD-ROM, a magnetic disk, RAM, ROM, EEPROM, EPROM, flash memory, optical memory, or combinations thereof. Memory 504 may be a tangible storage medium that stores non-transitory machine instructions. Processing circuit 500 may include any number of processors and memories. In other words, processor 502 may represent the collective processing devices of processing circuit 500 and memory 504 may represent the collective storage devices of processing circuit 500. Processor 502 and memory 504 may be on the same printed circuit board or may be in communication with each other via a bus or other form of connection.

I/O hardware 506 includes the interface hardware (e.g., a network interface) used by processing circuit 500 to receive data from other devices and/or to provide data to other devices. For example, a command may be sent from processing circuit 500 to a controlled device of gaming machine 100 via I/O hardware 506. I/O hardware 506 may include, but is not limited to, hardware to communicate on a local system bus and/or on a network. For example, I/O hardware 506 may include a port to transmit display data to an electronic display and another port to receive data from the network 206 shown in FIG. 2.

Processing circuit 500 may store game data 508 in memory 504. In general, game data 508 includes information about the operation of games provided at any number of electronic devices (e.g., gaming machine 100) within the gaming system 200. Example data in game data 508 may include information regarding the game, the amount wagered by a player in a gaming round of the game, which in-game events occur during the gaming round, the results of the round (e.g., the amount won or lost by the player), or any other information regarding the operation of the game. Game data 508 may also include information related to the game, such as processing instructions for providing the game, which may be executed by the processor 502 to provide the game. In one embodiment, game data 508 is received via I/O hardware 506 from the devices.

Memory 504 may store player data 510 which identifies players of the one or more games associated with game data 508. Player data 510 may include information to identify an individual player, such as the player's name, phone number, address, contact information, or the like. In one embodiment, player data 510 corresponds to loyalty accounts held by individual patrons of a gaming establishment and/or online gaming service. For example, a player of a gaming machine may identify himself or herself by swiping a loyalty card, using a biometric reader, entering a screen name, or the like. Based on the information provided by the player, the player's account may be associated with the corresponding game data 508 for the player. For example, the player may earn loyalty points in his or her account based on game play.

Figure 6:
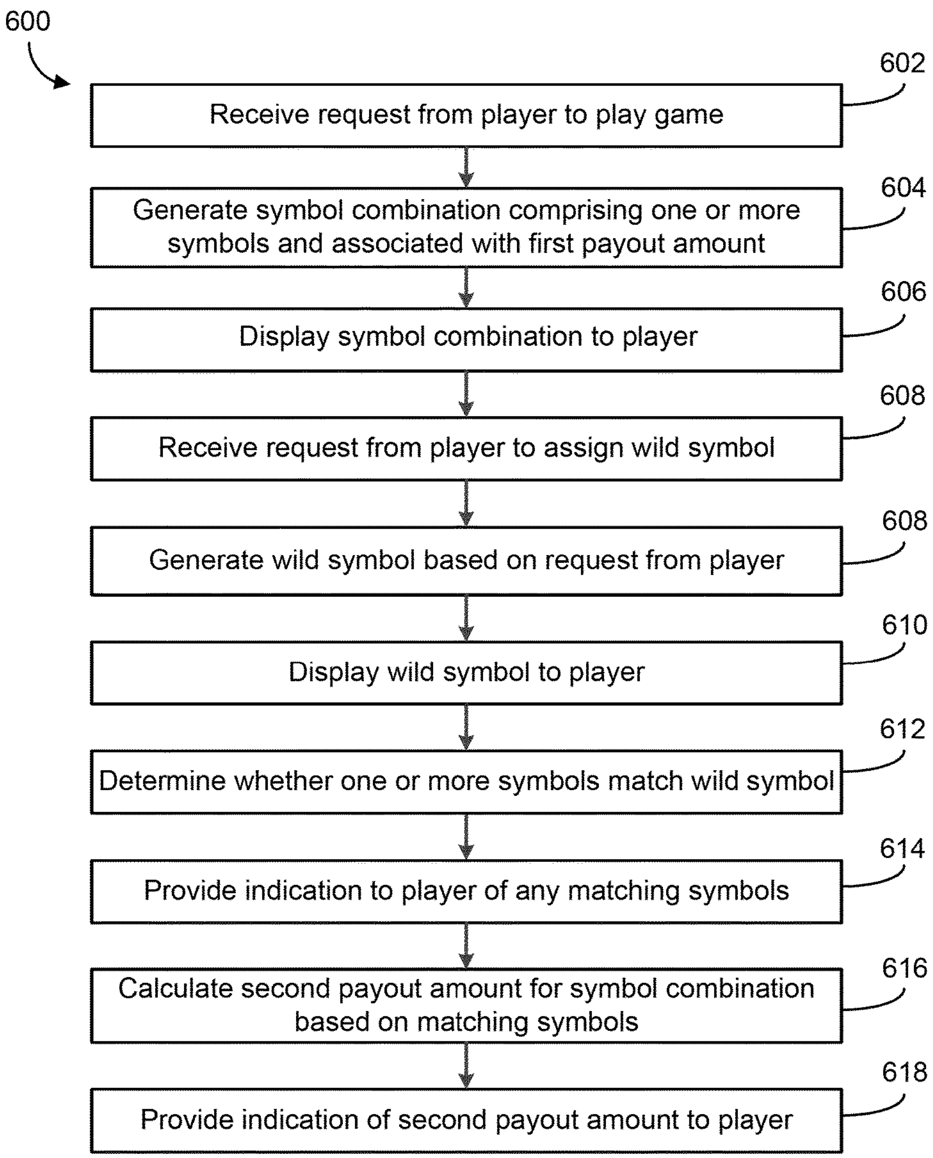
FIG. 6 is a flow chart diagram of a process for providing a game at a gaming machine having one or more symbols, including enabling a player to initiate assignment of a wild symbol, according to one embodiment.

Referring now to FIG. 6, a process 600 is shown for providing a game at a gaming machine (e.g., gaming machine 100), according to an exemplary embodiment. The process 600 may include enabling a player of the gaming machine to request assignment of a wild symbol within the game at a time selected by the player. The process 600 may be performed by a server (e.g., server 204), a gaming machine (e.g., machine 100), a processing circuit (e.g., circuit 500, processor 502, etc.), or any other systems and devices described herein. At 602, a request is received from the player to play a game (e.g., the game described herein, a card game, etc.). The game may be any game playable via a gaming machine and based on a symbol combination having one or more symbols. The player may request the game via one or more user inputs (e.g., buttons 108) of the gaming machine. In one embodiment, the player may send the request by placing a wager.

At 604, a symbol combination is generated within the game based on the request from the player. The symbol combination comprises one or more symbols selected from a symbol set. The symbol set may be predetermined or selected by the player. The symbol combination may be randomly selected from the symbol set. As an example, the symbol combination may be a random combination of symbols (e.g., symbols 304) generated via an algorithm stored within the game controller of the gaming machine. The symbol combination may form a grid having a number of symbol spaces. In one embodiment, the symbol combination is associated with a first payout amount. For instance, the game may include a number of paylines crossing the grid and a payout amount may be determined based on an interaction between the symbol combination and the paylines. In one embodiment, a payout amount is determined by comparing the symbol combination to a payout table stored within memory (e.g., memory 604). The payout table may include a combination of each of the symbol combinations, any potential paylines, as well as the wager placed to determine a payout for the combination. A first payout amount may be determined when the symbol combination is generated based on the symbol combination and the wager placed by the player (e.g., wager amount, paylines played, etc.).

At 606, the symbol combination is presented via a display (e.g., displays 120, 122) of the gaming machine. The display may be an electronic display screen having a grid section (e.g., section 302) in which the symbol combination is displayed. The first payout amount may also be displayed along with the symbol combination. At 608, a request is received from the player to assign a wild symbol (e.g., symbol 312). The player may use the controls of the gaming machine to send the request, such as by pressing one or more of buttons 108 or by pressing a touchscreen of the machine (e.g., displays 120, 122). At 610, the wild symbol 312 is generated based on the request from the player. The wild symbol 312 is then displayed to the player. The wild symbol 312 may be randomly selected from the symbol set used to select the symbol combination (e.g., symbols 304). When the player sends the request to assign the wild symbol 312, a wild section 310 of the display may cycle randomly through the symbol set to select the wild symbol 312, as described above. For instance, upon receiving the request, the wild section 310 may cycle through the symbol set from a stop and then slow again to select the wild symbol 312. The wild section 310 may also begin by cycling through the symbol set and begin to slow to a stop to select the wild symbol 312 upon receiving the request from the player.

At 612, the process 600 includes determining whether any of the one or more symbols 304 matches the wild symbol 312. At 614, an indication is provided to the player of any matching symbols. This may include the wild marker 406 shown in FIG. 4. The matching symbols may be an identical match or may be those symbols 304 that are similar to the wild symbol 312. At 616, a second payout amount is calculated for the symbol combination based on the matching symbols. For instance, each of the matching symbols 304 may be given a greater value based their designation as "wild," such that the second payout amount is greater than or equal to the first payout amount. At 618, an indication of the second payout amount is provided to the player (e.g., via the displays 120, 122).

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines (EGMs); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

In various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, a gaming system may include a plurality of EGMs that are each configured to communicate with a central server, central controller, or a remote host through a data network.

In certain embodiments in which the gaming system includes an EGM in combination with a central server, central controller, or remote host, the central server, central controller, or remote host is any suitable computing device (such as a server) that includes at least one processor and at least one memory device or storage device. The EGM may include at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs).

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (e.g., main cabinet 102 shown in FIG. 1). In other embodiments, at least one of the at least one processor of the EGM and the at least one memory device of the EGM reside outside the cabinet of the EGM.

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

In various embodiments, the EGM includes one or more input devices. The input devices may include any suitable device that enables an input signal to be produced and received by the at least one processor of the EGM. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. It should be appreciated that, in some embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display decreases by one, and a number of credits shown in a bet display increases by one.

In other embodiments, one input device of the EGM is a cash out device. The cash out device is utilized to receive a cash payment or any other suitable form of payment corresponding to a quantity of remaining credits of a credit display.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are inputted to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, one input device of the EGM is a card reader in communication with the at least one processor of the EGM. The card reader is configured to read a player identification card inserted into the card reader.

In various embodiments, the EGM includes one or more output devices (e.g., displays 120, 122 shown in FIG. 1). One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status; (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. In another such embodiment, the EGM provides dynamic sounds coupled with attractive multimedia images displayed on one or more of the display devices to provide an audiovisual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as “EGMs.” Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as “primary games”) and/or any secondary or bonus games or other functions (referred to herein as “secondary games”) displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. In various embodiments, the primary game(s) and the secondary game(s) may comprise any suitable games and/or wagering games, such as, but not limited to: electro-mechanical or video slot or spinning reel type games; video card games such as video cribbage, video draw poker, multi-hand video draw poker, other video poker games, video blackjack games, and video baccarat games; video keno games; video bingo games; and video selection games.

In certain embodiments in which the secondary game or the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. In certain embodiments, one or more of the reels are independent reels or unisymbol reels. In such embodiments, each independent reel generates and displays one symbol.

In certain such embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing agent. Alternatively or in addition, the program instructions can be encoded on an artificially-generated propagated signal (e.g., a machine-generated electrical, optical, or electromagnetic signal) that is generated to encode information for transmission to suitable receiver agent for execution by a data processing agent. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing agent on data stored on one or more computer-readable storage devices or received from other sources.

The term "client or "server" include all kinds of agent, devices, and machines for processing data, including by way of example a programmable processor, a computer, a system on a chip, or multiple ones, or combinations, of the foregoing. The agent can include special purpose logic circuitry, e.g., an FPGA (field programmable gate array) or an ASIC (application-specific integrated circuit). The agent can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The agent and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and agent can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of operating a gaming machine, the method comprising:

responsive to a payment acceptor receiving a physical item, establishing, via a game controller, a credit balance based at least in part on a monetary value associated with the received physical; and for a play of a game:

determining, via the game controller, one or more symbols from a predetermined symbol set to form a symbol combination associated with a first payout amount;

displaying, via a display device, the determined one or more symbols which form the symbol combination;

independent of the determined one or more symbols which form the symbol combination and responsive to receiving, via an input device, a wild symbol assignment request from a player, assign a symbol from the predetermined symbol set to function as a wild symbol for the play of the game, wherein prior to the assignment, the symbol assigned to function as a wild symbol did not function as a wild symbol for the play of the game; and responsive to receiving the wild symbol assignment request from the player:

displaying, via the display device, the symbol assigned to function as a wild symbol;

determining whether any of the determined one or more symbols which form the symbol combination is the symbol assigned to function as a wild symbol, and responsive to determining that at least one of the determined one or more symbols which form the symbol combination is the symbol assigned to function as a wild symbol:

calculating a second payout amount for the symbol combination based on each of the at least one of the determined one or more symbols functioning as a wild symbols, wherein the second payout amount is at least equal to the first payout amount, and the credit balance is increasable based on the calculated second payout; and displaying, via the display device, the calculated second payout amount.

2. The method of claim 1, wherein the symbol assigned to function as a wild symbol is displayed within a wild section of the display device, and further comprising:

prior to receiving the wild symbol assignment request from the player, randomly cycling the predetermined symbol set through the wild section;

wherein, upon receiving the request, slowing the cycling of the predetermined symbol set to randomly select the symbol assigned to function as a wild symbol.

3. The method of claim 1, wherein the second payment amount is calculated by increasing a payout value of each of the determined one or more symbols that is the symbol assigned to function as a wild symbol.

4. The method of claim 3, wherein each of the determined one or more symbols that is the symbol assigned to function as a wild symbol is assigned a multiplier based on the symbol assigned to function as a wild symbol, and the payout value is increased according to the multiplier.

5. The method of claim 1, further comprising:

after displaying the symbol assigned to function as a wild symbol, receiving a request from the player to re-assign the symbol assigned to function as a wild symbol; and responsive to receiving the request:

displaying, via the display device, a second symbol assigned to function as a wild symbol;

calculating a third payout amount based on the second symbol assigned to function as a wild symbol and an interaction between the second symbol assigned to function as a wild symbol and the determined one or more symbols, wherein the third payout amount is at least equal to the first payout amount; and displaying, via the display device, the third payout amount.

6. The method of claim 5, further comprising:

prior to determining the one or more symbols, receiving a first wager from the player, the credit balance being decreasable based on the received first wager; and prior to displaying the second symbol assigned to function as a wild symbol, receiving a second wager from the player, wherein the credit balance is decreasable based on the received second wager.

7. The method of claim 1, further comprising:

determining one or more bonus symbols and displaying the one or more bonus symbols to the player via the display device;

wherein the second payout amount is calculated based on an interaction between the bonus symbols and the determined one or more symbols that are the symbol assigned to function as a wild symbol.

8. The method of claim 1, further comprising:

prior to determining the one or more symbols which form the symbol combination, receiving a first wager from the player, wherein the credit balance is decreasable based on the received first wager; and prior to displaying the symbol assigned to function as a wild symbol, receiving a second wager from the player, wherein the credit balance is decreasable based on the received second wager.

9. A gaming device comprising:

a display device;

a user input device;

a payment device; and a game controller having a processor and a storage device storing instructions that, when executed by the processor, cause the processor to:

establish a credit balance based at least in part on a monetary value associated with a physical item received via the payment device; and for a play of a game:

cause the display device to display one or more symbols from a predetermined symbol set to form a symbol combination associated with a first payout amount;

independent of the displayed one or more symbols which form the symbol combination and responsive to receiving, via the user input device, a wild symbol assignment request from a player, assign a symbol from the predetermined symbol set to function as a wild symbol for the play of the game, wherein prior to the assignment, the symbol assigned to function as a wild symbol did not function as a wild symbol for the play of the game; and responsive to receiving the wild symbol assignment request from the player:

cause the display device to display the symbol assigned to function as a wild symbol;

determine whether any of the displayed one or more symbols which form the symbol combination is the symbol assigned to function as a wild symbol; and responsive to determining that at least one of the displayed one or more symbols which form the symbol combination is the symbol assigned to function as a wild symbol:

calculate a second payout amount for the formed symbol combination based on each of the at least one of the displayed one or more symbols functioning as a wild symbols, wherein the second payout amount is at least equal to the first payout amount; and cause the display device to display the second payout amount, wherein the credit balance is increasable based on the second payout amount.

10. The gaming device of claim 9, wherein the symbol assigned to function as a wild symbol is displayed within a wild section of the display, and when executed by the processor, the instructions cause the processor to:

prior to receiving the wild symbol assignment request from the player, randomly cycle the predetermined symbol set through the wild section;

wherein, upon receiving the wild symbol assignment request from the player, slow the cycling of the predetermined symbol set to randomly select the symbol assigned to function as a wild symbol.

11. The gaming device of claim 9, wherein the second payment amount is calculated by increasing a payout value of each of the displayed one or more symbols that is the symbol assigned to function as a wild symbol.

12. The gaming device of claim 11, wherein each of the displayed one or more symbols that is the symbol assigned to function as a wild symbol is assigned a multiplier based on the symbol assigned to function as a wild symbol, and the payout value is increased according to the multiplier.

13. The gaming device of claim 9, wherein when executed by the processor, the instructions cause the processor to:

after causing the display device to display the symbol assigned to function as a wild symbol, receiving a request from the player to re-assign the symbol assigned to function as a wild symbol; and responsive to receiving the request:

cause the display device to display a second symbol assigned to function as a wild symbol;

calculate a third payout amount based on the second symbol assigned to function as a wild symbol and an interaction between the second symbol assigned to function as a wild symbol and the displayed one or more symbols, wherein the third payout amount is at least equal to the first payout amount; and cause the display device to display the third payout amount.

14. The gaming device of claim 13, wherein when executed by the processor, the instructions cause the processor to:

prior to causing the display device to display the one or more symbols which form the symbol combination, receive a first wager from the player, wherein the credit balance is decreasable based on the received first wager; and prior to causing the display device to display the second symbol assigned to function as a wild symbol, receive a second wager from the player, wherein the credit balance is decreasable based on the received second wager.

15. The gaming device of claim 9, wherein when executed by the processor, the instructions cause the processor:

determine one or more bonus symbols, and cause the display device to display the determined one or more bonus symbols to the player;

wherein the second payout amount is calculated based on an interaction between the bonus symbols and the displayed one or more symbols that are the symbol assigned to function as a wild symbol.

16. The gaming device of claim 9, wherein when executed by the processor, the instructions cause the processor to:

prior to causing the display device to display the one or more symbols that form the symbol combination, receive a first wager from the player, wherein the credit balance is decreasable based on the received first wager; and prior to causing the display device to display the symbol assigned to function as a wild symbol, receive a second wager from the player, wherein the credit balance is decreasable based on the received second wager.

17. A gaming system comprising:

a processor; and a memory device which stores a plurality of instruction that, when executed by the processor after receiving data associated with an establishment of a credit balance based on a receipt, via a payment acceptor, of a physical item associated with a monetary value, for a play of a game, cause the processor to:

communicate data which results in a display device displaying one or more symbols from a predetermined symbol set which form a symbol combination associated with a first payout amount;

independent of the displayed one or more symbols which form the symbol combination and responsive to receiving data associated with a wild symbol assignment request from a player, assign a symbol from the predetermined symbol set to function as a wild symbol for the play of the game, wherein prior to the assignment, the symbol assigned to function as a wild symbol did not function as a wild symbol for the play of the game; and responsive to receiving the data associated with the wild symbol assignment request from the player:

communicate data which results in the display device displaying the symbol assigned to function as a wild symbol;

determine whether any of the displayed one or more symbols which form the symbol combination is the symbol assigned to function as a wild symbol; and responsive to determining that at least one of the displayed one or more symbols which form the symbol combination is the symbol assigned to function as a wild symbol:

determine a second payout amount for the symbol combination based on each of the at least one of the displayed one or more symbols functioning as a wild symbols, wherein the second payout amount is at least equal to the first payout amount, and the credit balance is increasable based on the second payout amount; and communicate data which results in the display device displaying an indication of the determined second payout amount.

18. The gaming system of claim 17, wherein the symbol assigned to function as a wild symbol is displayed within a wild section, and when executed by the processor, the instructions cause the processor to:

prior to receiving the data associated with the wild symbol assignment request from the player, randomly cycle the predetermined symbol set through the wild section;

wherein, upon receiving the data associated with the wild symbol assignment request from the player, slow the cycling of the predetermined symbol set to randomly select the symbol assigned to function as a wild symbol.

19. The gaming system of claim 17, wherein the second payment amount is determined by increasing a payout value of each of the displayed one or more symbols that is the symbol assigned to function as a wild symbol.

20. The gaming system of claim 19, wherein each of the displayed one or more symbols that is the symbol assigned to function as a wild symbol is assigned a multiplier based on the symbol assigned to function as a wild symbol, and the payout value is increased according to the multiplier.

21. The gaming system of claim 17, wherein when executed by the processor, the instructions cause the processor to:

after communicating the data which results in the display device displaying the symbol assigned to function as a wild symbol, receiving data associated with a request from the player to re-assign the symbol assigned to function as a wild symbol; and responsive to receiving the data associated with the request:

communicate data which results in the display device displaying a second symbol assigned to function as a wild symbol;

determine a third payout amount based on the second symbol assigned to function as a wild symbol and an interaction between the second symbol assigned to function as a wild symbol and the displayed one or more symbols, wherein the third payout amount is at least equal to the first payout amount; and communicate data which results in the display device displaying the determined third payout amount.

22. The gaming system of claim 21, wherein when executed by the processor, the instructions cause the processor to:

prior to communicating the data which results in the display device displaying the one or more symbols which form the symbol combination, receive data associated with a first wager from the player, wherein the credit balance is decreasable based on the first wager; and prior to communicating the data which results in the display device displaying the second symbol assigned to function as a wild symbol, receive data associated with a second wager from the player, wherein the credit balance is decreasable based on the second wager.

23. The gaming device of claim 17, wherein when executed by the processor, the instructions cause the processor to:

prior to communicating the data which results in the display device displaying the one or more symbols which form the symbol combination, receive data associated with a first wager from the player, wherein the credit balance is decreasable based on the first wager; and prior to communicating the data which results in the display device displaying the symbol assigned to function as a wild symbol, receive data associated with a second wager from the player, wherein the credit balance is decreasable based on the second wager.

* * * * *